United States Patent [19]

Ripple

[11] 4,179,449

[45] Dec. 18, 1979

[54] HALOALKYL HYDROXY-AROMATIC CONDENSATION PRODUCTS AS FUEL AND LUBRICANT ADDITIVES

[75] Inventor: David E. Ripple, Kirtland, Ohio

[73] Assignee: The Lubrizol Corporation, Wickliffe, Ohio

[21] Appl. No.: 932,977

[22] Filed: Aug. 11, 1978

Related U.S. Application Data

[60] Division of Ser. No. 684,818, May 10, 1976, Pat. No. 4,108,783, which is a continuation-in-part of Ser. No. 459,424, Apr. 9, 1974, abandoned.

[51] Int. Cl.$^2$ .................................... C07D 307/60
[52] U.S. Cl. .................... 260/346.74; 260/465 F; 260/559 A; 560/75; 562/478; 525/332; 525/333; 525/334; 525/335
[58] Field of Search ........ 260/346.74, 465 F, 559 A; 560/75; 562/478; 568/780

[56] References Cited

U.S. PATENT DOCUMENTS

| | | | |
|---|---|---|---|
| 3,116,305 | 12/1963 | Morris et al. | 260/410.5 |
| 3,125,531 | 3/1964 | Matson | 252/54.6 |
| 3,260,672 | 7/1966 | MacPhail et al. | 252/54.6 |
| 3,542,680 | 11/1970 | LeSuer | 252/57 |
| 3,565,592 | 2/1971 | Mehmedbasich | 44/63 |
| 3,579,449 | 5/1971 | Wann et al. | 252/49.5 |
| 3,701,640 | 10/1972 | Lease et al. | 44/66 |

FOREIGN PATENT DOCUMENTS

1274796  5/1972  United Kingdom.

OTHER PUBLICATIONS

Martin, R. W., The Chem. of Phenolic Resins, Wiley, N.Y. 1956, pp. 224–225.
Flett et al., Maleic Anhydride Derivatives, Wiley, N.Y. 1952, p. 185.

Primary Examiner—Alan L. Rotman
Assistant Examiner—B. I. Dentz
Attorney, Agent, or Firm—James W. Adams, Jr.; Daniel N. Hall

[57] ABSTRACT

Condensation products made by reacting an alpha-haloalkyl hydroxy-aromatic compound also having at least one non-fused hydrocarbyl substituent with at least one olefinic nitrile, carboxylic acid or carboxylic acid derivative are useful as additives for fuels and lubricants. The number of carbon atoms in the aromatic hydrocarbyl compound's substituents are each about 25 while the haloalkyl group contains from one to about 36 carbons. The acid or nitrile reactant usually contains three to about forty carbons. Products made from halomethyl alkyl-substituted phenols and α,β-olefinic diacid derivatives such as maleic anhydride are particularly useful. Similarly useful products can be made from these condensation products by further reacting their acid, acid derivative or nitrile groups with alcohols, polyols, monoamines, polyamines, metal salts or metals.

19 Claims, No Drawings

HALOALKYL HYDROXY-AROMATIC CONDENSATION PRODUCTS AS FUEL AND LUBRICANT ADDITIVES

REFERENCE TO RELATED APPLICATIONS

This application is a division of my co-pending U.S. application Ser. No. 684,818 filed May 10, 1976, now U.S. Pat. No. 4,108,783 which is a continuation-in-part of my then co-pending application Ser. No. 459,424 filed Apr. 9, 1974, now abandoned.

BACKGROUND OF THE INVENTION

1. Field of the Invention

This invention relates to novel condensation products useful as additives for lubricants and normally liquid fuels, as well as to lubricant and normally liquid fuel compositions containing these additives. It also relates to processes for making such products and concentrates containing them. More particularly the additives of this invention are made by reacting certain alpha-haloalkyl hydroxy-aromatic compounds with an olefinic nitrile, acid or acid derivative.

2. Description of the Prior Art

The use of relatively high molecular weight compositions characterized by the presence within their structure of both lipophilic and lipophobic groups as additives for normally liquid fuels (e.g., gasoline, jet fuel, kerosene, fuel oil, heating oil, etc.) and naturally occurring and synthetic lubricants, is well known to the art. See, for example, the discussions in "Lubricant Additives" by C. V. Smalheer and R. Kennedy Smith published by the Lezius-Hiles Co., Cleveland, Ohio, particularly pages 2–5, and "Lubricant Additives" by M. W. Ranney, published by the Noyes Data Corporation, Park Ridge, New Jersey (1973), particularly pages 3–92.

Among the additives that have been used in fuel and lubricants are those described in U.S. Pat. Nos. 3,701,640; 3,558,743; and 3,493,520.

The materials described in the U.S. Pat. Nos. 3,558,743 and 3,493,520 are made by reacting a carboxylic acid- or anhydride-containing addition copolymer, an amine, an alkylated phenol and an aldehyde, while those described in the U.S. Pat. No. 3,701,640 are made by reacting a carboxylic acid with a polyamine having at least three nitrogen atoms, at least two of which are primary and at least one which is secondary, and alkyl-substituted phenol and formaldehyde. Trimerization of chloromethyl phenols has been reported in *Journal of the Chemical Society*, Perkin I, 359 (1973). This reaction is believed to occur through quinone methides such as those described by A. B. Turner, "Quarterly Reviews", 18, 347 (1964).

Despite the knowledge evidenced by the above-noted prior art, the search for new additives for fuels and lubricants continues. This continuing search has been prompted in part by the increasingly severe demands put on fuels and lubricants by efforts to reduce pollution caused by operation of engines using such materials as well as economic considerations and material shortages. It is an object of the present invention to provide additives, processes, concentrates and compositions which satisfy these increased demands.

SUMMARY OF THE INVENTION

The condensation products of the present invention are made by the process comprising reacting (A) at least one alpha haloalkyl hydroxy aromatic compound of the general formula

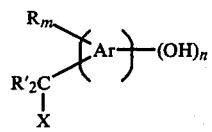

Formula I wherein Ar is a hydrocarbyl aromatic nucleus of 6 to about 30 carbon atoms, or a substituted analog of such an aromatic nucleus substituted with one or more up to three each of lower alkoxy, lower alkylthio, chloro, or nitro substituents, each R is a nonfused hydrocarbyl group of about 25 to about 700 carbon atoms, X is a halogen atom, each R' is independently a hydrogen atom, an alkyl group of 1 to 36 carbon atoms, or a halogen-substituted alkyl group of 1 to about 36 carbon atoms, n is 1 to 3 and m is 1 to 5 with the provisos that (i) the total number of carbon atoms in both the R' groups does not exceed 36 and (ii) where m exceeds 1, one of the R groups can also be a

with (B) at least one alpha-beta olefinically unsaturated compound selected from the group consisting of $C_{2-40}$ hydrocarbyl nitriles, $C_{2-40}$ hydrocarbyl carboxylic acids and anhydrides, esters, amides and ammonium and metal salts of said $C_{2-40}$ carboxylic acids, the reaction of (A) with (B) resulting in the formation of a carbon-to-carbon bond, said bond including the carbon of at least one

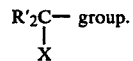

At least one hydroxy group of the hydroxy-aromatic compounds of Formula I is directly bonded to an aromatic carbon of Ar. Preferably X is a bromine or chlorine atom; and the haloalkyl group

is a chloro- or bromomethyl group. If m exceeds 1, one R group can also be a

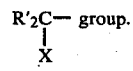

The nucleus Ar in Formula I can be purely hydrocarbyl in nature (e.g., benzene, naphthene, toluene, xylene, etc.) or it can have one or more (up to a total of 3) optional substituents such as lower alkoxy (i.e., of less than 7 carbon atoms, e.g., methoxy, 2-propyloxy, etc.) alkylthio, chloro or nitro substituents.

The aromatic compounds of the present invention have at least one non-fused hydrocarbyl substituent (R in Formula I) which can be saturated or ethylenically unsaturated, aliphatic, alicyclic or aromatic in nature. The term "non-fused" in this application and the appended claims is used to indicate that the substituent is attached at only one carbon to an aromatic ring of Ar. These R substituents are substantially saturated, (i.e., containing no more than one unsaturated carbon-to-carbon bond per every ten carbon-to-carbon single bonds) and are of about 25 and about 700 carbon atoms. Preferably they are saturated alkyl groups. While free carbon of the aromatic nucleus Ar of Formula I can bear a R substituent, it is preferable that no more than three do (i.e., m is 3). More typically, m is 1 or 2.

It is to be noted that when the term "hydrocarbyl" is used in describing a substituent in this specification and the appended claims, it is also intended to embrace substantially hydrocarbyl substituents unless expressly stated otherwise. Such substantially hydrocarbyl substituents are those which are substituted with non-hydrocarbyl groups which do not substantially affect the hydrocarbyl character or nature of the substituent in the context of the invention and which would, therefore, be considered to be within the scope of the term "hydrocarbyl" by a skilled worker in the art. For example, it is obvious that a $C_{30}$ hydrocarbyl substituent and a $C_{30}$ hydrocarbyl substituent substituted with a methyl mercapto or methoxy group would be substantially similar in their properties with regard to their use in this invention, and would, in fact, be recognized as equivalents in the context of this invention by one of ordinary skill in the art.

Non-limiting examples of groups that do not significantly alter the hydrocarbyl nature of the hydrocarbyl substituents of this invention include the following: Ether (especially hydrocarbyloxy and particularly pendant alkoxy groups of up to ten carbon atoms); Oxa, e.g., —O— linkages in the main hydrocarbyl chain; Hydroxy; Nitro; Cyano; Non-alpha halo, particularly fluoro-, chloro- and bromo-; Thioether (especially pendant $C_1$–$C_{10}$ alkyl thioethers); Thia, e.g., —S— linkage in the main hydrocarbyl chain;

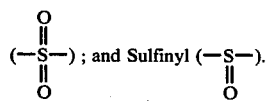

In general, when non-hydrocarbyl groups are present in the R substituents of Formula I, there will be no more than two such groups for every ten carbon atoms in the hydrocarbyl substituent; preferably not more than one for each ten carbon atoms. Generally, however, it is preferred that no such substituents be present and that the R substituents be solely or purely hydrocarbyl in nature.

The non-fused hydrocarbyl substituents, R, of this invention are typically long-chain, relatively high molecular weight hydrocarbyl substituents having at least 25 carbon atoms, such as those typified by the alkyl groups derived from petroleum wax, which is a predominantly straight-chain aliphatic hydrocarbon of at least 25 carbon atoms. Relatively high molecular weight R groups derived from polymerization of lower olefins, particularly 1-monoolefins, can also be used as the source of the hydrocarbyl substituent.

Generally, the sources of the hydrocarbyl R groups include principally the high molecular weight substantially saturated petroleum fractions and substantially saturated olefin polymers, particularly polymers of monoolefins having from 2 to about 30 carbon atoms. The especially useful polymers are the polymers of 1-monoolefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are exemplified by 2-butene, 3-pentene, and 4-octene.

Also useful are the interpolymers of the olefins such as those mentioned above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3-3-dimethyl-1-pentene with 1-hexene; isobutene with styrene and piperylene; etc.

The relative proportions of the monoolefins to the other monomers in the interpolymers influence the stability and oil-solubility of the final substituted hydroxy aromatic condensation products containing groups derived from such interpolymers. Thus, for reasons of oil solubility and stability the R groups contemplated for use in this invention should be substantially aliphatic and substantially saturated, i.e., they should contain at least about 80%, preferably at least about 95%, on a weight basis of units derived from the aliphatic monoolefins and no more than about 5% of olefinic linkages based on the total number of carbon-to-carbon covalent linkages. In most instances, the percentages of olefinic linkages should be less than about 2% of the total number of carbon-to-carbon covalent linkages.

Specific examples of such interpolymers include copolymer of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

Another source of the substantially hydrocarbon R groups comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers having number average molecular weights ($\overline{M}n$) of about 750–5000 is preferred. Higher molecular weight olefin polymers having molecular weights as measured by vapor pressure osometry or gel permeation chromatography from about 5000 to about 100,000 or higher have been found to be useful in specific instances.

Examples of preferred R groups are those derived from polyisobutenes of number average molecular weights ranging from about 400 to about 10,000. Preferably, these isobutenes have minimum $\overline{M}n$'s of about 700 or about 1000 and maximum $\overline{M}n$'s of about 3000 or about 5000.

Such hydrocarbyl R groups can be bonded to the aromatic rings of the Ar moiety of Formula I by techniques well known to those of skill in the art, such as alkylation reactions in the presence of Lewis acids such as BF₃, AlCl₃, SnCl₄, etc. Since such alkylation techniques are well known, they need not be described further at this point.

The alpha-haloalkyl hydroxy-aromatic compounds of this invention can often be conveniently derived by methods discussed hereinafter from hydrocarbyl-substituted hydroxy-aromatic precursors of the general formula;

   Formula II

Typical of such precursors are the following:
2,4-di(polybutyl) phenol wherein each polybutyl group has an average of 30 to 50 carbon atoms;
4-polypropyl phenol, the polypropyl group having an $\overline{M}n$ of about 450; and
4-polyisobutenyl phenol, the polyisobutyl group having an $\overline{M}n$ of about 2200, etc.

Many other suitable precursors within the above-discussed limitations will readily come to the mind of the skilled artisan. Mixtures of two or more of such precursors can also be used and in many instances may be commercially preferred because they do not involve costly separation processes in their production.

Further examples of hydroxy-aromatic precursors from which the alpha-haloalkyl compounds of this invention can be derived include substituted phenols, resorcinols, hydroquinones, catechols, anisoles, xylenols, hydroxydiphenyl compounds (i.e., phenyl phenols), benzyl phenol, phenylethyl phenol, bisphenol-A, alpha and beta naphthol, alpha and beta methyl naphthol, ethoxy naphthol, methyl thio naphthol, anthracenol, phenylmethyl naphthol, phenanthrol, the monomethyl ether of catechol, phenoxy phenol, chlorophenol, and the like. Thus the Ar moiety of Formula I can be a phenyl, methylphenyl, diphenyl, naphthyl, anthryl, phenanthryl, chlorophenyl or phenoxyphenyl moiety.

The Ar moiety can also be a bridged moiety wherein two or more aromatic rings are connected through a bridging unit such as a covalent carbon-to-carbon bond (i.e., directly linking the two aromatic rings); an oxygen, sulfur, polysulfide,

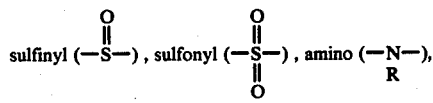

methylene or substituted methylene groups (wherein the substitution is by C₁₋₇ hydrocarbyl groups), can also be used.

Particularly preferred hydroxy-aromatic precursors used as sources of the haloalkyl hydroxy-aromatic compounds of the present invention are mono-substituted phenols and naphthols, particularly the mono-substituted phenols (i.e., where Ar is phenyl and n and m are both one in Formula I). In such mono-substituted phenols, R can be a relatively high molecular weight long-chain group containing about 25 to about 250 carbon atoms. Typical of such groups are alkyl and alkenyl groups made from homo- and interpolymers of ethylene, propylene, butylenes and isobutylene.

In view of the above limitations, it is clear that the alpha-halo hydroxy-aromatic compounds of this invention will have a minimum of about 32 carbon atoms. The maximum number of carbon atoms is limited only by the size of the non-fused R substituent, i.e., 700 carbons. Preferably, the alpha-halo hydroxy-aromatic compounds will have a minimum of about thirty carbon atoms and a maximum of about 400 carbon atoms in the R portion of their molecules.

The alpha-haloalkyl hydroxy-aromatic compounds used in this invention can be made by a number of processes well known to those of the art. A particularly useful method is by reaction of a hydroxy-aromatic precursor such as those described above in Formula II, with a carbonyl reagent such as an aldehyde or ketone in the presence of a halogen source such as a hydrogen halide. In general, useful aldehydes or ketones contain between one and about 36 carbon atoms. Carbonyl reagents containing one to ten carbon atoms and no carbon-to-carbon bond unsaturation are particularly preferred. To produce the desired alpha-haloalkyl

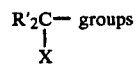 groups these aldehydes and ketones must be aliphatic or alicyclic alkyl in nature; preferably, they are aliphatic aldehydes such as formaldehyde, (and its polymers such as trioxane and paraformaldehyde as well as solutions such as formalin), acetaldehyde, butanal, octanal, octadecanal, etc.

Thus, among the preferred aldehydes for use in making the alpha-halohydroxy alkyl-aromatic compounds of the present invention are those of the general formula R′CHO, wherein R′ is a hydrogen atom or an alkyl group of up to 36 carbon atoms.

Preferred ketones which can be used to produce the desired alpha-haloalkyl

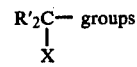 groups are those of the general formula $$R'\overset{\text{O}}{\underset{\|}{C}}R',$$

wherein each R′ group is an alkyl group of up to 36 carbon atoms with the proviso that the total of carbons in both (R′)s is about 36. Typical useful ketones include acetone, methylethyl ketone, methylbutyl ketone, cyclohexanone, acetyl cyclopentane, methyl octadecyl ketone, etc. Acetone and precursors thereof (e.g., the diethyl ketal) are among the preferred ketones.

The halogen atom, X, is the afore-described

 group can be a fluorine, chlorine, bromine or iodine atom but usually it is a chlorine or bromine atom. Typically, X is a chlorine atom.

Methods for reacting the above-described carbonyl reagents with hydroxy-aromatic precursors are well known to those skilled in the art and need not be discussed in detail here. Generally, about 0.5 to about 5.0 moles, preferably about 1 to 2 moles, of carbonyl reagent per mole of hydroxy-aromatic precursor is reacted at a temperature of about −15° C. to about 300° C. in the presence of at least an equivalent amount of at least one hydrogen halide. If desired the hydrogen halide can be omitted and introduced in a subsequent step. The reaction is often carried out in the presence of a non-volatile or volatile substantially inert organic liquid solvent or diluent (e.g., petroleum naphtha or diluent mineral oil) for about 0.1 to about 48 hours. Preferred minimum reaction times are about one to about two hours while preferred maximums are about ten to about eighteen hours. These reactions can be catalyzed by Lewis acids, particularly Lewis acid halides, such as $BF_3$, $ZnCl_2$, $FeCl_3$, etc.

Such reactions are disclosed in U.S. Pat. No. 2,964,442 which is hereby incorporated by reference for its relevant disclosures.

While the just-described carbonyl reagent/hydroxy-aromatic precursor reaction is among the preferred methods for producing the alpha-haloalkyl compounds of the present invention, it is by no means the only such method. Other methods such as free radical or ionic halogenation of an appropriately substituted hydroxy aromatic precursor (e.g., one having a methyl substituent) will readily occur to the skilled artisan. Therefore, in its broadest aspects, this invention is not limited by the process used to produce the alpha-haloalkyl alkylated hydroxy-aromatic compounds used in it.

The products of this invention are made by reacting the afore-described alpha-haloalkyl alkylated hydroxy-aromatic compounds with at least one alpha-beta olefinically unsaturated compounds selected from the group consisting of $C_{2-40}$ hydrocarbyl nitriles, $C_{2-40}$ hydrocarbyl carboxylic acids or derivatives thereof. The carboxylic acid derivatives contemplated include anhydrides, esters, amides, ammonium salts, metal salts, etc., made by reacting the afore-said acid with various types of mono- and polyamines, mono- or polyhydric alcohols, ammonia, metal salts, etc., as described in further detail below.

The olefinic carboxylic acids used in preparing the compositions of the present invention may be either monobasic or polybasic in nature. When they are polybasic, they are often dicarboxylic acids although tri- and tetracarboxylic acids can also be used. Generally, useful monobasic acids have three to about forty carbon atoms, while useful polybasic acids have four to forty carbon atoms. Preferably the maximum number of carbons for either type of acid is about twenty.

Exemplary monobasic olefinic carboxylic acids used in preparing the products of this invention are those of the formula: R°COOH wherein R° has between two and up to about 39, usually up to about 20 carbon atoms and is further characterized by the presence of at least one olefinically unsaturated carbon-to-carbon bond within its structure. R° can be aliphatic or alicyclic in nature and can contain other hydrocarboxyl substituents such as aryl groups, alkylaryl, heterocyclic, etc. Preferred acids correspond to the formula R"CH=CHCOOH or

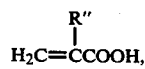

wherein R" is hydrogen or a saturated or ethylenically unsaturated aliphatic substituent of up to about 37 carbon atoms. Usually R" is hydrogen or a $C_{1-7}$ alkyl group. While R° can contain more than one olefinic linkage (either conjugated or nonconjugated), usually R° contains only one olefinic linkage.

Specific examples of useful $\alpha,\beta$-olefinic monobasic carboxylic acids are acrylic acid, methacrylic acids, cinnamic acid, crotonic acid, 3-phenyl propenoic acid, $\alpha,\beta$-decenoic acid, etc.

As stated above, the olefinic carboxylic acid reactant used to prepare the products of this invention can be polybasic, often dibasic, containing up to forty carbon atoms. Exemplary polybasic acids include maleic acid, fumaric acid, mesaconic acid, itaconic acid and citraconic acid.

The olefinic nitriles used to prepare the products of the present invention are generally analogous to the aforedescribed acids in that they have structures in which at least one of the carboxylic acid group has been replaced by a nitrile group. They also contain about two to about 40 carbon atoms exclusive to the nitrile carbons. Thus, such compounds as acrylonitrile, methylacrylonitrile, cinnamic nitrile, maleic and fumaric dinitrile, oleyl nitrile, 2-methylene glutaronitrile, etc., can be used to make the products of the present invention. Further examples include 1-butylvinyl nitrile, 1-hexylvinyl nitrile, 1-cyclohexenyl nitrile, 1-t-butylvinyl nitrile, 2-methylvinyl nitrile (i.e., crotonic nitrile), 2-dodecylvinyl nitrile, 2,2'-didodecylvinyl nitrile, 2-cyclopentylvinyl nitrile, 2-octyl-2-methylvinyl nitrile, etc. Other useful nitriles include such compounds as 1-phenylvinyl nitrile, 2-phenylvinyl nitrile, 1-tolylvinyl nitrile and 2-phenylethylvinyl nitrile.

As noted before, the acid derivatives useful in preparing the products of the present invention are generally anhydrides, esters, amides, amines, ammonium and metal salts of the afore-described acids. Methods of preparing such derivatives are well known to those of skill in the art and they can be satisfactorily described by noting the reactants used to produce them. Thus, for example, derivative esters for use in the present invention can be made by esterifying monohydric or polyhydric alcohols with any of the aforedescribed acids. In general these mono- and polyhydric alcohols contain from one to about thirty carbon atoms, preferably, one to about twenty carbon atoms. Exemplary aliphatic and alicyclic monohydric alcohols include methanol, ethanol, isopropanol, n-butanol, tertiary butanol, isooctanol, cyclopentanol, cyclohexanol, behenyl alcohol, hexacosanol, neopentyl alcohol, isobutyl alcohol, benzyl alcohol, betaphenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, secondary pentyl alcohol, tertiary butyl alcohol, 5-bromo-dodec-5-enol, 3-nitro-octadecanol, the dioleate of glycerol, etc.

Useful polyhydric alcohols generally contain from two to ten hydroxy groups and two to about 25 carbons. These include, for example, ethylene glycol, dipentylene glycol, triethylene glycol, tetraethylene glycol, dipropylene glycol, tripropylene glycol, dibutylene glycol, tributylene glycol, neopentyl glycol and other alkylene glycols in which the alkylene radical contains from two to about eight carbon atoms. Other useful polyhydric alcohols include glycerol, monooleate of glycerol, monostearate of glycerol, monomethyl ether of glycerol, pentaerythritol, di- and tri-pentaerythritol, lower alkyl esters of 9,10-dihydroxy stearic acid, 1,2-butanediol, 2,3-hexanediol, trimethylolpropane, 2,4-hexanediol, pinacol, erythritol, arabitol, sorbitol, mannitol, 1,2-cyclohexanediol, xylene glycol, etc.

The derivative esters can also be derived from unsaturated alcohols such as allyl alcohol, cinnamyl alcohol, propargyl alcohol, 1-cyclohexene-3-ol, oleyl alcohol, etc. Still other classes of the alcohols capable of yielding the esters of this invention comprise the etheralcohols and amino-alcohols including, for example, the oxyalkylene-, oxy-arylene-, amino-alkylene-, and amino-arylene-substituted alcohols having one or more oxyalkylene, aminoalkylene or amino-arylene oxy-arylene radicals. They are exemplified by Cellosolve, Carbitol, phenoxyethanol, heptylphenyl-(oxypropylene)$_6$-H, octyl-(oxyethylene)$_{30}$-H, phenyl(oxyoctylene)$_2$-H, mono(-heptylphenyl-oxypropylene)-substituted glycerol, poly(styrene oxide), amino-ethanol, 3-amino ethyl-pentanol, di(hydroxyethyl)amine, p-aminophenyl, tri(hydroxypropyl)amine, N-hydroxyethyl ethylene diamine, N,N,N',N'-tetrahydroxytrimethylene diamine, and the like. For the most part the ether-alcohols having up to about 15 oxy-alkylene radicals in which the alkylene radical contains from one to about eight carbon atoms are preferred. Generally the mono- and polyhydric alkanols of up to about 16 carbon atoms and one to six hydroxyl groups are preferred.

Similarly, amide and ammonium derivatives of the aforedescribed acids can also be used to make the products of this invention. Such derivatives are prepared from monoamino compounds, hydroxyamino compounds, polyamino compounds, and hydroxy polyamine compounds. For the purposes of this invention, hydrazines and organically substituted hydrazines are included within the various classes of amino compounds. Mixtures of these various amino compounds containing two or more of the foregoing amines can also be employed to make useful nitrogen derivatives.

Among the amines useful in preparing the nitrogen derivatives for use in this invention are monoamines. These monoamines can be tertiary, but more typically they contain at least one H—N—linkage. Thus primary and secondary amines are typical. These amines are generally substituted with $C_{1-30}$ hydrocarbyl groups. Usually these hydrocarbyl substituents are aliphatic in nature and contain between one and ten carbon atoms. Saturated aliphatic hydrocarbyl substituents containing one to ten carbon atoms are generally useful.

The hydrocarbyl substituents of the above-described monoamines can be aliphatic, cycloaliphatic, and aromatic substituents (including aliphatic- and cycloaliphatic-substituted aromatic substituents and aromatic- and aliphatic-substituted cycloaliphatic substituents).

Among the preferred monoamines useful in making the derivatives used in making the products of the present invention are amines of the general formula $HNR^2R^3$ wherein $R^2$ is an alkyl group of up to ten carbon atoms and $R^3$ is a hydrogen atom or an alkyl group of up to ten carbon atoms. Another preferred class of monoamines are aromatic monoamines of the general formula $HNR^4R^5$ wherein $R^4$ is a phenyl, alkylated phenyl, naphthyl or alkylated napthyl group of up to ten carbon atoms and $R^5$ is a hydrogen atom, an alkyl group of up to 10 carbon atoms or $R^4$. Representative examples of these monoamines are ethyl amine, diethyl amine, n-butyl amine, di-n-butyl amine, allyl amine, isobutyl amine, coco amine, stearyl amine, lauryl amine, methyl lauryl amine, oleyl amine, aniline, paramethyl aniline, N-monomethyl aniline, diphenyl amine, benzyl amine, tolyl amine, methyl-2-cyclohexyl amine, etc.

Hydroxy amines are also included in the class of useful monoamines. Such compounds are the hydroxy-hydrocarbyl-substituted analogs of the afore-described monoamines. Preferred hydroxy monoamines have the following general formulae:

$HNR^7R^6$ and $HNR^9R^8$ wherein $R^7$ is an alkyl or hydroxy-substituted group of up to 10 carbon atoms, $R^6$ is a hydrogen atom or $R^7$, $R^9$ is a hydroxy-substituted phenyl, alkylated phenyl, naphthyl or alkylated naphthyl of up to 10 carbon atoms and $R^8$ is a hydrogen atom or $R^9$ with provisos that at least one of $R^7$ and $R^6$ and at least one of $R^9$ and $R^8$ is hydroxy-substituted.

Suitable hydroxy-substituted monoamines include ethanol amine, di-3-propanol amine, 4-hydroxybutyl amine, diethanol amine, n-methyl-2-propyl amine, 3-hydroxy aniline, N-hydroxyethyl-ethylene diamine, N,N-di(hydroxypropyl)propylene diamine, and tris(hydroxymethyl)methyl amine, etc. While, in general, those hydroxy amines containing only one hydroxy group will be employed as reactants, those containing more can also be used. Mixtures of two or more such hydroxy amines can also be used.

Heterocyclic amines are also useful in making amide derivatives, providing they contain a primary or secondary amino group. The cycle can also incorporated unsaturation and can be substituted with hydrocarbyl substituents such as alkyl, alkenyl, aryl, alkaryl or aralkyl substituents. In addition, the cycle can also contain other heteroatoms such as oxygen and sulfur or other nitrogen atoms including those not having hydrogen atoms bonded to them. Generally, these cycles have 3 to 10, preferably 5 to 6 ring members. Among such heterocycles are aziridines, azetidines, azolidines, tetra- and dihydropyridines, pyrroles, piperidines, imidazoles, indoles, di- and tetrahydro-imidazoles, piperazines, isoindoles, purines, morpholines, thiamorpholines, N-aminoalkyl morpholines, N-aminoalkyl thiamorpholines, azepines, azocines, azonines, azecines and tetra-, di- and perhydro-derivatives of each of the above, and mixtures of two or more of these heterocycles. Preferred heterocyclic amines are the saturated 5- and 6-membered heterocyclic amines, especially the piperidines, piperazines, and morpholines as discussed above.

Alkylene polyamines are also useful as amines for preparing nitrogen derivatives. These polyamines include hydroxy polyamines and usually conform, in most part, to the formula

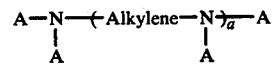

wherein a is an average of integers between about 1 and about 10, preferably between 2 and 8; each A is independently a hydrogen atom, a hydrocarbyl group or a hydroxy-substituted hydrocarbyl group having up to about 10 atoms, and "Alkylene" is a divalent hydrocarbyl radical of one to eighteen carbons. Analogous polyamines wherein one or more "Alkylene N" moiety
|
A is replaced by a cyclic moiety such as a "(Alkylene)$_2$N" moiety (e.g., piperazine) can also be used. Usually A is an aliphatic group of up to about 10 carbon atoms or an aliphatic group of up to about 10 carbon atoms substituted with one or two hydroxy groups, and "Alkylene" is a lower alkylene group having between 1 and 10, preferably 2 to 6 carbon atoms with the proviso that at least one A is hydrogen. Alkylene polyamines where each A is hydrogen with the ethylene polyamines are useful. Such alkylene polyamines include ethylene polyamines, butylene polyamines, propylene polyamines, pentylene polyamines, hexylene polyamines, heptylene polyamines, etc. The higher homologs of such amines and related aminoalkyl-substituted piperazines are also included.

Polyamines useful in preparing the amide derivatives include ethylene diamine, triethylene tetramine, tris(2-aminoethyl)amine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 1,3-bis(2-aminoethyl)imidazoline, 1-(2-aminopropyl)piperazine, 1,4-bis(1-aminoethyl)piperazine, 2-methyl-1-(2-aminobutyl)piperazine, etc. Higher homologs are obtained by condensing two or more of the above-illustrated alkylene amines and likewise are useful as are mixtures of two or more of the afore-described polyamines.

Ethylene polyamines, such as those mentioned above, are especially useful for reasons of cost and effectiveness. Such polyamines are described in detail under the heading "Diamines and Higher Amines" in "Kirk-Othmer Encyclopedia of Chemical Technology", Second Edition, Volume 7, pages 27–39, Interscience Publishers, Division of John Wiley and Sons, 1965. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. These mixtures are particularly useful in preparing the compositions of this invention. On the other hand, quite satisfactory products can also be obtained by the use of pure alkylene polyamines.

Hydroxy polyamines, e.g., alkylene polyamines having one or more hydroxyalkyl substituents on the nitrogen atoms, are also useful in preparing amide or ester derivatives. Preferred hydroxyalkyl-substituted alkylene polyamines are those in which the hydroxyalkyl group is a lower hydroxyalkyl group, i.e., having less then about 10 carbon atoms. Examples of such hydroxyalkyl-substituted polyamines include N-(2-hydroxyethyl)ethylene diamine, N,N'-bis(2-hydroxyethyl)ethylene diamine, 1-(2-hydroxyethyl)piperazine, monohydroxypropyl-substituted diethylene triamine, dihydroxypropyl-substituted tetraethylene pentamine, N-(3-hydroxybutyl)tetramethylene diamine, etc.

Higher homologs are obtained by condensation of the above-illustrated hydroxyalkyl-substituted alkylene amines through amino radicals or through hydroxy radicals as well as mixtures of the above are likewise useful.

The amide derivatives useful in making the products of this invention can also be prepared from hydrazine or an organo-substituted hydrazine of the general formula

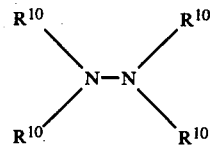

wherein each $R^{10}$ is independently hydrogen or a $C_1$–$C_{30}$ hydrocarbyl substituent, usually with at least one $R^{10}$ being a hydrogen atom. More generally at least two $R^{10}$ groups are hydrogen. Often at least two $R^{10}$ groups bonded to the same nitrogen atom are hydrogen and the remaining $R^{10}$ groups are alkyl groups of up to ten carbon atoms.

Examples of substituted hydrazines are methylhydrazine; N,N-dimethylhydrazine; N,N'-dimethylhydrazine; phenylhydrazine; N-phenyl-N'-ethylhydrazine; N-(p-tolyl)-N'-(n-butyl)hydrazine; N-(p-nitrophenyl)-N-methylhydrazine; N,N'-di-(p-chlorophenyl)hydrazine; N-phenyl-N'-cyclohexylhydrazine; etc.

Mixtures of two or more of the afore-described amines and polyamines can also be used in making the nitrogen-containing derivatives used in making the products of this invention.

Also among the useful nitrogen-containing derivative products are N-acrylo- and methacrylo-amino sulfonic acids such as those disclosed in U.S. Pat. No. 3,717,687 which is hereby incorporated by reference for its relevant disclosures.

Means for the production of ester and nitrogen derivatives from the afore-described alcohols and amines are well known to those of skill in the art and need not be described in detail here.

The ammonium salt derivatives can also be made from any of the afore-described amines as well as from tertiary amino analogs of them (i.e., analogs wherein the —NH groups have been replaced with -N-hydrocarbyl or —N—hydroxy hydrocarbyl groups), ammonia or ammonium compounds (e.g., NH$_4$Cl, NH$_4$OH, etc.) by techniques well known to those of skill in the art.

The metal salt derivatives useful in making the products of the present invention can also be made by techniques well known to those of skill in the art. Preferably they are made from a metal, mixture of metals, metal salt or mixture of metal salts where the metal is chosen from Group Ia, Ib, IIa, or IIb of the periodic table although metals from Groups IVa, IVb, Va, Vb, VIa, VIb, VIIb and VIII can also be used. The gegan ion of the metal salt can be inorganic such as halide, sulfide, oxide, hydroxide, nitrate, sulfate, thiosulfate, phosphite, phosphate, etc., or organic such as lower alkanoic, sulfonate, etc. The salts formed from these metals and the acid products can be either "normal" salts wherein the metal and acid are present in stoichiometric amounts or "overbased" salts. The production of the latter are well known to those of skill in the art and are described in detail in the afore-cited "Lubricant Additives" by M. W. Ranney, pages 67–77, which is hereby incorporated by reference for its relevant disclosures.

To form the products of this invention, the afore-described haloalkyl hydroxy-aromatic compounds and carboxylic acid, acid derivative or nitrile compounds are reacted together at a temperature ranging from about 15° C. to the decomposition temperature of the reactant or product present having the lowest decomposition temperature. Preferably the lowest reaction temperature is about 100° C., more preferably 150° C., while the highest reaction temperature is preferably about 300° C., more preferably 250° C. Generally the ratio of hydroxy compound to acid, acid derivative, or nitrile lies between about 0.5:1 to about 2:1. The reaction is normally carried out in about 0.5 to about 96 hours. It is often desirable to carry out such reactions in the presence of an inert solvent-diluent such as a hydrocarbon or ether boiling from about 50° C. to 200° C. or lubricant base stocks such as those described below.

After reaction the acidic or nitrile groups in the products of this invention can be further modified by post-treatment with one of the afore-described alcohols, amino compounds, metals or salts. Such reactions and the means and conditions for carrying them out are well known to those of skill in the art.

Post-treated reaction products can be made by reacting the reaction products described hereinabove with a post-treating reactant selected from the group consisting of (1) mono- and polyhydric alkanols and alkenols of 1 to about 10 carbon atoms and 1 to about 6 hydroxyl groups, (2) monoepoxides of $C_{2-18}$ alkenes, (3) alkyl mono amines of 1 to about 18 carbon atoms, (4) alkylene polyamines of 2 to about 10 nitrogen atoms and 2 to about 36 carbon atoms and (5) mixtures of two or more of (1) to (4) including mixtures within one class and mixtures of species selected from two or more classes.

A nitrile group can be converted to an amidine or amide through reaction with an amine, etc. or to an amino group through hydrogenation.

The condensation and reaction products of this invention are characterized by the fact that the reaction of the hydroxyaromatic compound (A) with the olefinic acid or nitrile (B) results in the formation of carbon-to-carbon bond which includes as one of its carbon atoms the carbon bearing the X atom in at least one

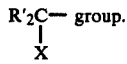

group.

This means that the reaction of (A) with (B) is not a simple esterification although some minor amount of esterification may occur. The other carbon of the newly formed carbon-to-carbon bond is believed to come from the acid or nitrile compounds (B).

The following non-limiting examples demonstrate the practice of the present invention in its various aspects. All parts and percentages are by weight unless expressly stated otherwise.

EXAMPLE 1(a)

A mixture of 1412 parts of phenol and 1090 parts of benzene is heated to 50°–55° C.; then 283 parts of a boron trifluoride phenol complex (BF$_3$.2 Phenol) is added over twenty minutes. Following this addition, 5000 parts of a polyisobutene having a $\overline{M}n$ of about 1000 is added. The mixture is stirred for two hours at 55°–60° C. and then 645 parts of ammonium hydroxide is added. Stirring is continued for an additional hour. The mixture is heated to 160° C. for four hours while an azeotrope of phenol, water and benzene distills from it. Stripping the mixture to 220° C./10 mm Hg and filtering it through diatomaceous earth provides the desired alkylated phenol which has a $\overline{M}n$ of 1047 and an infrared spectrum consistent with its structure as an alkylated phenol.

EXAMPLE 1(b)

A mixture of 4549 parts of the alkylated phenol described in Example 1(a), 540 parts of paraformaldehyde and 2500 parts of petroleum naphtha boiling between 96° and 102° C. is heated to 55°–60° C. for two hours to affect homogenization. Gaseous hydrogen chloride is then bubbled into the reaction mixture at a rate of 2 cfh through a glass tube whose orifice is located below the mixture's surface for a total of twelve hours. The mixture is stirred for an additional 3.5 hours and blown with nitrogen at a rate of 1.5 to 2 cfh for an additional eight hours. The mixture is filtered through filter aid and the filtrate stripped to 90° C./25 mm Hg to provide the final product which has a chlorine content of 2.1%, and an infrared spectrum consistent with its structure as a chloromethylated alkylated phenol.

EXAMPLE 1(c)

A mixture of 4302 parts of the chloromethyl alkylated phenol described in Example 1(b) and 274 parts of maleic anhydride is heated to 210°–215° C. for 7.5 hours while being nitrogen blown. Excess maleic anhydride is removed by stripping the mixture to 210° C./10 mm and the reaction mixture diluted with 2973 parts of a diluent oil. Filtration with filter aid provides a 40% solution of the desired product.

EXAMPLE 2

To 2028 parts of the 40% oil solution described in Example 1(c) at 140°–145° C. is slowly added 65 parts of a polyethylene polyamine having an average of three to seven amino groups per molecule. The reaction mixture is heated at 175°–180° C. for two hours and the mixture then filtered through diatomaceous earth to provide a 40% oil solution of the desired product.

Examples 3–7 are all carried out in substantially the same fashion using the following procedure: A mixture of haloalkyl substituted phenol and unsaturated compound is heated under nitrogen to a temperature of 200°–240° C. for four to six hours. The mixture is stripped to approximately 200° C./10–25 mm Hg to obtain a residue which is then diluted with an approximately equal volume of diluent oil and filtered through diatomaceous earth to yield a filtrate which is a solution of the desired product. Details as to the reactants and proportions used in Examples 3 to 7 are summarized in Table I.

TABLE I

| Example No. | α-Haloalkyl-phenol | (moles) | Unsaturated Reactant | (moles) |
|---|---|---|---|---|
| 3 | Example 1(b) | (0.245) | 2-Ethylhexyl acrylate | (0.25) |
| 4 | Example 1(b) | (0.245) | di(n-butyl)fumarate | (0.25) |
| 5 | Example 1(b) | (0.32) | Itaconic Acid | (0.32) |
| 6 | Example 1(b) | (0.2) | 4-Cyclohexene-1,2-dicarboxylic acid anhydride | (0.2) |
| 7 | Alkyl-substituted chloromethyl phenol[1] | (2.55) | Maleic Anhydride | (2.8) |

[1]Made alkylating phenol with a mixture of $C_{15-18}$ 1-Olefins according to general procedure described in Example 1(a).

EXAMPLE 8(a)

A mixture of 1030 parts of the alkylated phenol described in Example 1(a), 40 parts sodium hydroxide and 370 parts Stoddard solvent is refluxed under nitrogen at 128°–168° C. for 1.75 hours as water azeotropes out as a distillate. An additional charge of 180 parts of Stoddard solvent is added and refluxing continued for another hour until virtually all the water is removed as an azeotrope. Then at 155°–162° C. 51.5 parts of sulfur dichloride is added dropwise to the reaction mixture over 1.5 hours and the mixture heated at 162° C. for 2.5 hours. After being cooled to room temperature, the reaction mixture is treated with 50 parts of water and 10 parts of concentrated hydrochloric acid. It is then refluxed at 106°–156° C. for 5.0 hours under nitrogen. Water again azeotropes out of the mixture. Twenty parts of diatomaceous earth is added to the reaction mixture and it is filtered at 70° C. The filtrate is stripped to 152° C./13 mm Hg to provide the desired sulfurized phenol product, which has a sulfur content of 1.64% and a $\overline{\mathrm{Mn}}$ of 1207 (by vapor pressure osometry).

EXAMPLE 8(b)

A mixture of 809 parts of the sulfurized phenol described in 8(a) and 575 parts of hydrocarbon diluent boiling at 96° C. to 102° C. is treated at 46°–49° C. with a stream of gaseous hydrogen chloride for 0.5 hour. Then 38 parts of paraformaldehyde is slowly added while HCl treatment continues. The mixture is kept at 48°–51° C. for 6 hours while HCl treatment continues and a total of 69 parts of gaseous hydrogen chloride is added to the reaction mixture. The mixture is heated to 81°–105° C. for four hours while water azeotropes from it. Fifteen parts of diatomaceous earth is added and the mixture filtered. The filtrate is stripped to 115° C./23 mm Hg to provide the desired final product which has a sulfur content of 1.59% and a chlorine content of 1.28%.

EXAMPLE 8(c)

A mixture of 767 parts of the chloromethylated sulfurized phenol described in 8(b) and 30 parts of maleic anhydride is heated at 208°–211° C. for 5 hours. Then 523 parts of diluent mineral oil is added. The mixture is stripped to 219° C./20 mm Hg and filtered through diatomaceous earth to provide as a filtrate a solution of the desired product containing 40% mineral oil.

EXAMPLE 9

To 500 parts of the product described in Example 8(c) at 110° C. under nitrogen is added 10.5 parts of the polyamine described in Example 2. The mixture is heated at 156° C. for 3.5 hours. Stripping to 180° C./21 mm and filtration through diatomaceous earth provides an oil solution of the final product. This solution has a nitrogen content of 0.71%.

EXAMPLE 10

A mixture of 1504 parts of the reaction product of Example 8(c) and 45 parts of pentaerythritol is heated under nitrogen blowing at 205°–211° C. for 12 hours. Then 27 parts of diluent oil is added to the mixture and it is filtered through diatomaceous earth to provide an oil solution of the desired product.

EXAMPLE 11(a)

A mixture of 3400 parts of the product of Example 1(c) and 17 parts of water is heated to 90°–100° C. for 2.5 hours. An infrared spectrum of the product shows a substantial reduction in anhydride absorptions, thus demonstrating the substantial presence of the desired free diacid.

EXAMPLE 11(b)

To a mixture of 2982 parts of the product described in Example 11(a) and 24 parts of lithium hydroxide monohydrate catalyst at 90° C. is added 86 parts of propylene oxide. Provision is made for recycling the propylene oxide as it evaporates from the reaction mixture. The mixture is kept at 90°–100° C. for four hours while an additional 105 parts of propylene oxide is fed into it. The reaction temperature is then raised in stages to 180°–190° C. An additional 2.4 grams of lithium hydroxide monohydrate catalyst is added and the reaction mixture heated for ten hours at 140°–160° C. Stripping of the mixture to 160° C./4 mm Hg followed by addition of 95 parts of a diluent oil and filtration through diatomaceous earth provides the desired product as a 60% solution in diluent oil.

EXAMPLE 12

A mixture of 2945 parts of 60% solution in diluent oil of the reaction product described in Example 1(c) and 172 parts pentaerythritol is heated to 200°–210° C. for five hours. The reaction mixture is then cooled to 165° C. and 27 parts of the polyamine described in Example 2 is added. The mixture is heated to 160°–165° C. for three hours. Diluent oil (123 parts) and filter aid are added to the reaction mixture and it is filtered to provide a 60% active oil solution of the desired product. This solution has a nitrogen content of 0.28%.

EXAMPLE 13

A mixture of 1000 parts of the chloromethylated phenol described in 1(b) and 120 parts of 2-methylene glutaronitrile is heated at 210°–250° C. for a total of seven hours. Provision is made for collection of the HCl evolved in a caustic trap and at the end of the reaction substantially all of the theoretical amount of HCl has been released. The mixture is then cooled and 110 parts of diluent oil is added. This mixture is filtered through diatomaceous earth to provide a solution of the desired product.

EXAMPLE 14

A mixture of 100 parts of the oil solution described in Example 13 and 15 parts of a commercial polyethylene polyamine having a nitrogen content of 33.8% and an average composition corresponding to pentaethylene hexamine is slowly stirred at 90° C. as a total of 1.4 parts of gaseous hydrogen sulfide catalyst is slowly introduced into it. The reaction mixture is heated at 140°–150° C. under nitrogen for nine hours. The reaction mass is then filtered through filter aid at 100° C. to provide an oil solution of the desired product, which is characterized by its infrared spectrum having absorptions at approximately 3.12 microns indicative of

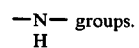

As previously indicated, the condensation products of this invention are useful as additives in preparing lubricant compositions where they function primarily as detergents and dispersants, particularly where the oil is subjected to high temperature environments or to cyclic stresses such as those encountered in stop-and-go automobile driving. Many such compositions are particularly useful in dispersing engine sludge and reducing engine varnish. The products of this invention can be employed in a variety of lubricant compositions based on diverse oils of lubricating viscosity, including natural and synthetic lubricating oils and mixtures thereof. These lubricant compositions include crankcase lubricating oils for spark-ignited and compression-ignited internal combustion engines, including automobile and truck engines, two-cycle engines, rotary engines, aviation piston engines, marine and railroad diesel engines, and the like. In addition, automatic transmission fluids, transaxle lubricants, gear lubricants, metal-working lubricants, hydraulic fluids and other lubricating oil and grease compositions can also benefit from the incorporation therein of the products of the present invention.

Natural oils useful in making these compositions include animal oils and vegetable oils (e.g., castor oil, lard oil) as well as liquid petroleum oils and solvent-refined or acid-refined mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, etc.); and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1000, diphenyl ether of polyethylene glycol having a molecular weight of 500-1000, diethyl ether of polypropylene glycol having a molecular weight of 1000-1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, ethylene glycol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as trimethylolpropane, pentaerythritol, dipentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-tetraethyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

The preferred lubricating oils which serve as base stocks for the lubricant compositions of this invention have viscosities ranging from about 100 centistokes at 0° F. to about 2000 centistokes at 210° F.

Generally, the lubricant compositions of the present invention contain an amount of the products of this invention sufficient to provide the composition with sludge dispersancy and engine detergent properties. Normally this amount will be about 0.05 to about 20, preferably about 0.50 to about 10% of the total weight of the lubricant composition. In lubricating oils operated under extremely adverse conditions, such as lubricating oils for marine diesel engines, the reaction products of this invention may be present in amounts of up to about 30% by weight.

The normally liquid fuel compositions of this invention are generally derived from petroleum sources though they may include those produced synthetically by the Fischer-Tropsch and related processes, the processing of organic waste material or the processing of coal, lignite or shale rock. Such fuel compositions have varying boiling ranges, viscosities, cloud and pour points, etc., according to their end use as is well known to those of skill in the art. Among such fuels are those commonly known as motor and aviation gasoline, diesel fuels, jet engine fuel, kerosene, distillate fuels, heating oils, residual fuels, bunker fuels, etc. The properties of such fuels are well known to skilled artisans as illustrated, for example, by ASTM Specifications D #396-73 (Fuel Oils) and D #439-73 (Gasolines) available from the American Soceity for Testing Materials, 1916 Race Street, Philadelphia, Pa. 19103.

The fuel compositions of the present invention can contain about 0.001% to about 5% (based on the weight of the final composition), preferably about 0.001% to about 1%, of the above-described products. The presence of these products can impart many desirable characteristics to the fuel composition depending upon the particular composition and fuel mixture selected. Thus in gasolines they may improve the overall composition ability to retard corrosion of metal parts with which it may come in contact or improve the fuel's ability to clean carburetors and reduce carburetor icing. On the other hand, these products can be used in fuel oil compositions and other normally liquid petroleum distillate fuel compositions to impart anti-screen clogging and demulsifying properties to the fuel.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, anti-oxidants such as 2,6-di-tertiary-butyl-4-methylphenol, rust inhibitors, such as alkylated succinic acids and anhydrides, bacteriostatic agents, gum inhibitors, metal deactivators, upper cylinder lubricants and the like.

The lubricant compositions of the present invention can contain, in addition to the products of this invention, other additives that are normally used in lubricants. Such additives include, for example, auxiliary detergents of the ash-forming and of the ashless type, viscosity index improving agents, pour-point depressants, anti-foam agents, extreme pressure agents, rust-inhibiting agents, oxidation- and corrosion-inhibiting agents.

In one embodiment of the present invention, the afore-described products are combined with other ashless dispersants for use in fuels and lubricants. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645; British Pat. Nos. 981,850 and 1,055,337; and U.S. Pat. Nos. 3,255,108; 3,311,558; 3,331,776; 3,346,354; 3,579,450; 3,542,680; 3,381,022; 3,639,242; 3,697,428; 3,708,522; and, British Patent Specification No. 1,306,529. These patents are expressly incorporated herein by reference for their disclosure of suitable esters and methods for their preparation.

Generally, the weight ratio of the reaction products of this invention to the aforesaid ashless dispersants is about 0.1 to 10.0, preferably about 1.0 to 10 parts of reaction product to 1 part ashless dispersant. Preferred weight ratios are between 0.5 to 2.0 parts reaction product to 1 part dispersant. In still another embodiment of this invention, the inventive additives are combined with Mannich condensation products formed from substituted phenols, aldehydes, polyamines, and substituted pyridines. Such condensation products are described in U.S. Pat. Nos. 3,649,659; 3,558,743; 3,539,633; 3,704,308; and 3,725,277, which are incorporated herein by reference for their disclosure of the preparation of the Mannich condensation products and their use in fuels and lubricants. When the additives of this invention are combined with the Mannich condensation products, a weight ratio of about 10 to about 0.1 parts reaction product of this invention per 1 part Mannich condensation product is used.

The products of this invention can be added directly to the fuel or lubricant to be treated or they can be diluted with an inert solvent/diluent such as the various oils and normally liquid fuels described in detail above to form an additive concentrate. These concentrates generally contain about 20 to about 90 percent product and can contain in addition any of the above-described prior art additives, particularly the afore-described ashless dispersants in the aforesaid proportions.

The fuel compositions of this invention are exemplified by the following.

EXAMPLE 15

A gasoline having a Reid vapor pressure of 8.4 psi and containing 120 parts per million parts of gasoline of the reaction product described in Example 2.

EXAMPLE 16

A diesel fuel oil containing 250 parts per million parts of fuel of the reaction product described in Example 4.

EXAMPLE 17

A gasoline having a Reid vapor pressure of 12 psi and containing 2.3 grams per gallon of tetraethyl lead and 75 parts per million parts of gasoline of the reaction product of Example 12.

Lubricant compositions and concentrate formulation of the present invention are exemplified by the following.

EXAMPLE 18

A solvent-refined, natural SAE 10 mineral oil containing 0.5% of the reaction product described in Example 2.

EXAMPLE 19

A synthetic lubricant comprised predominantly of $C_5-C_9$ normal alcohol esters of a 50/50 molar mixture of adipic and glutaric acids containing 0.5% of the reaction product described in Example 4.

EXAMPLE 20

A concentrate for use in blending gasolines comprised of 50% of the mineral oil of Example 18 and 50% of the product described in Example 4.

The solvent/diluents used in the additive concentrates of this invention are generally substantially inert, normally liquid organic materials such as hydrocarbon solvents (e.g., benzene, heptane, cyclohexane, mixed xylenes, petroleum naphthas and reformates, etc.), various petroleum fuel oil mixtures, lubricating oils and mixtures of same and the like.

As used in the specification and the appended claims, the term "substantially inert" when used to refer to solvents, diluents, concentrate base stocks and the like, is intended to mean that the solvent, diluent, etc., is inert to chemical or physical change under the conditions in which it is used so as not to materially interfere in an adverse manner with the preparation, storage, blending and/or functioning of the compositions, additive, compound, etc., of this invention in the context of its intended use. For example, small amounts of a solvent, diluent, etc., can undergo minimal reaction or degradation without preventing the making and using of the invention as described herein. In other words, such reaction or degradation, while technically discernible, would not be sufficient to deter the practical worker of ordinary skill in the art from making and using the invention for its intended purposes. "Substantially inert" as used herein is, thus, readily understood and appreciated by those of ordinary skill in the art.

The lubricant and liquid fuel compositions of this invention and the reaction products and the processes for preparing those products have been specifically set forth above to aid those skilled in the art in understanding and practicing the invention. Many obvious variations and departures from the specific disclosure will be apparent to those of skill in the art based on principles and teachings herein and in the prior art. Such variations and departures are contemplated as being within the scope of the present invention as defined by the appended claims.

What is claimed is:

1. A reaction product made by the process comprising reacting at a temperature ranging from about 15° C. to the decomposition temperature of the reactant or product present having the lowest decomposition temperature (A) at least one alpha haloalkyl hydroxyl aromatic compound of the general formula

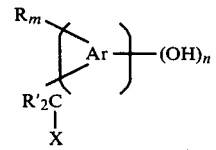

wherein Ar is a hydrocarbyl aromatic nucleus of 6 to about 30 carbon atoms, or a substituted analog of such an aromatic nucleus substituted with one or more up to 3 each of lower alkoxy, lower alkylthio, chloro, or nitro substituents, each R is a nonfused hydrocarbyl group of about 25 to about 700 carbon atoms, X is a halogen atom, each R' is independently a hydrogen atom, an alkyl group of 1 to 36 carbon atoms, or a halogen-substituted alkyl group of 1 to about 36 carbon atoms, n is 1 to 3 and m is 1 to 5 with the provisos that (i) the total number of carbon atoms in both the R' groups does not exceed 36 and (ii) where m exceeds 1, one of the R groups can also be a

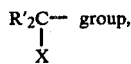

group, with (B) at least one alpha-beta olefinically unsaturated compound selected from the group consisting of $C_{2-40}$ hydrocarbyl nitriles, $C_{2-40}$ hydrocarbyl carboxylic acids and anhydrides, esters, amides and ammonium and metal salts of said $C_{2-40}$ carboxylic acids, the reaction of (A) with (B) resulting in the formation of a carbon-to-carbon bond, said bond including the carbon of at least one

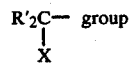

group wherein the ratio of (A) to (B) between 0.5:1 to about 2:1.

2. A product as claimed in claim 1 wherein Ar is hydrocarbyl and m is 1 or 2.

3. A product as claimed in claim 2 wherein Ar is a benzene nucleus.

4. A product as claimed in claim 1 wherein each R is a homo- or interpolymer of ethylene, propylene, butylene or isobutylene.

5. A product as claimed in claim 2 wherein each R is a homo- or interpolymer of ethylene, propylene, butylene or isobutylene.

6. A product as claimed in claim 3 wherein each R is a homo- or interpolymer of ethylene, propylene, butylene or isobutylene.

7. A product as claimed in claim 1 wherein both R' groups are hydrogen atoms and X is a chlorine atom.

8. A product as claimed in claim 2 wherein both R' groups are hydrogen atoms and X is a chlorine atom.

9. A product as claimed in claim 3 wherein both R' groups are hydrogen atoms and X is a chlorine atom.

10. A product as claimed in claim 4 wherein both R' groups are hydrogen atoms and X is a chlorine atom.

11. A product as claimed in claim 1 wherein (B) is an acid or anhydride.

12. A product as claimed in claim 3 wherein (B) is an acid or anhydride.

13. A product as claimed in claim 6 wherein (B) is an acid or anhydride.

14. A product as claimed in claim 7 wherein (B) is an acid or anhydride.

15. A product as claimed in claim 10 wherein (B) is an acid or anhydride.

16. A product as claimed in claim 11 wherein (B) is maleic anhydride.

17. A product as claimed in claim 3 wherein (B) is maleic anhydride.

18. A product as claimed in claim 6 wherein (B) is maleic anhydride.

19. A product as claimed in claim 10 wherein (B) is maleic anhydride.